United States Patent [19]

Teraoka et al.

[11] Patent Number: 5,434,023
[45] Date of Patent: Jul. 18, 1995

[54] PASTE-TYPE ELECTRODE FOR ALKALI SECONDARY CELL

[75] Inventors: Hirohito Teraoka, Ichikawa; Katuyuki Hata, Yamato; Kunihiko Miyamoto, Ichikawa; Kouji Ishiwa, Yokohama, all of Japan

[73] Assignee: Toshiba Battery Co., Ltd., Tokyo, Japan

[21] Appl. No.: 321,868

[22] Filed: Oct. 14, 1994

Related U.S. Application Data

[62] Division of Ser. No. 964,067, Oct. 21, 1992, Pat. No. 5,384,216.

[30] Foreign Application Priority Data

May 27, 1992 [JP] Japan .................................. 4-135268

[51] Int. Cl.$^6$ .......................... H01M 4/32; H01M 4/66
[52] U.S. Cl. .................... 429/218; 429/222; 429/223; 429/229; 429/245
[58] Field of Search ............... 429/233, 209, 218, 222, 429/223, 245, 249, 229, 213

[56] References Cited

U.S. PATENT DOCUMENTS

| | | | |
|---|---|---|---|
| 4,940,553 | 7/1990 | von Benda et al. | 429/223 |
| 4,985,318 | 1/1991 | Oshitani et al. | 429/223 |
| 5,032,475 | 7/1991 | Hasebe et al. | 429/223 |
| 5,077,149 | 12/1991 | Ikoma et al. | 429/218 |
| 5,200,282 | 4/1993 | Ohnishi et al. | 429/223 |
| 5,242,768 | 9/1993 | Nagatsuka et al. | 429/223 |

*Primary Examiner*—John Niebling
*Assistant Examiner*—Bruce F. Bell
*Attorney, Agent, or Firm*—Oblon, Spivak, McClelland, Maier & Neustadt

[57] ABSTRACT

There is provided a paste-type electrode for an alkali secondary cell which can suppress occurrence of internal short-circuiting, which is likely to happen when an electrode is rolled along with another electrode having the opposite polarity and a separator interposed therebetween. The paste-type electrode for an alkali secondary cell comprises a three-dimensional substrate including a felt-like metal porous member in which a plurality of hollow metal fibers are arranged three-dimensionally, diameters of those of the metal fibers arranged near the surface portion of the porous member being greater than those arranged in the inner portion, an average diameter of those of the metal fibers near the surface portion being in a range of 20 to 150 μm, and an average diameter of those of the metal fibers in the inner portion being in a range of 10 to 100 μm, and paste containing an activation substance filled in the three-dimensional substrate.

18 Claims, 5 Drawing Sheets

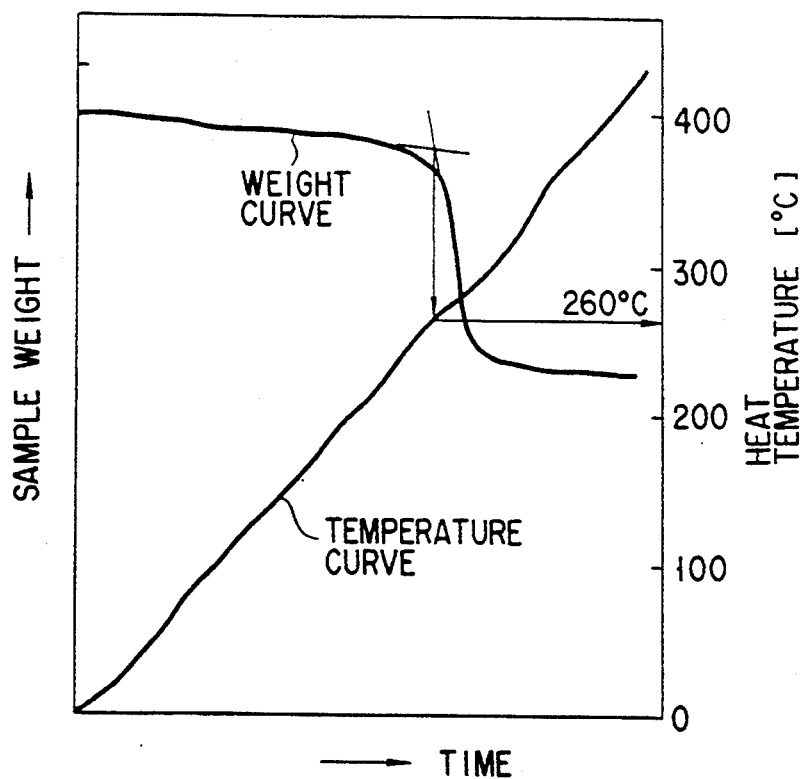
F I G. 4
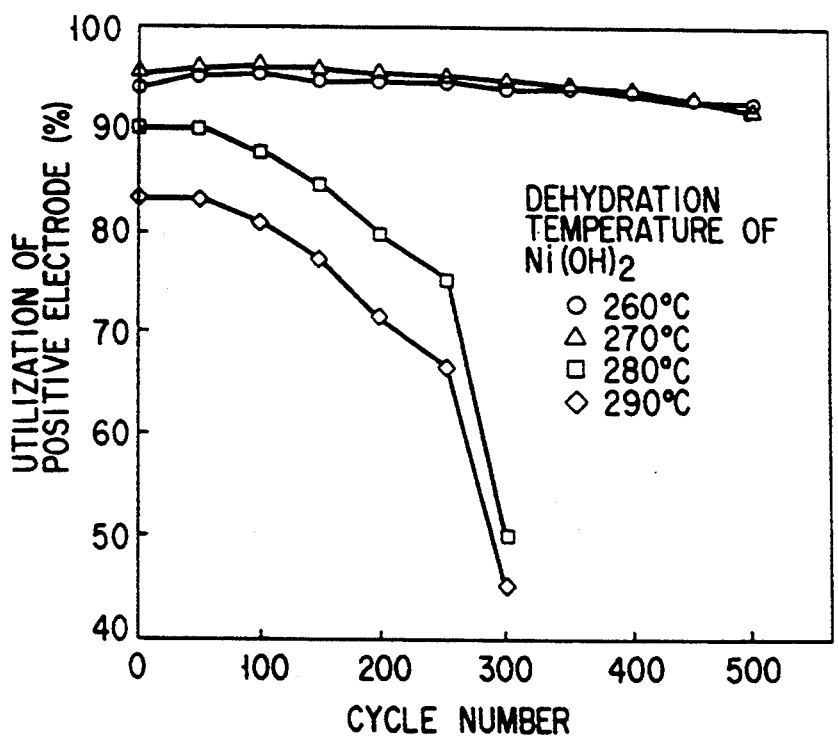
F I G. 5

PASTE-TYPE ELECTRODE FOR ALKALI SECONDARY CELL

This is a Division of application Ser. No. 07/964,067, filed on Oct. 21, 1992, now U.S. Pat. No. 5,384,216.

BACKGROUND OF THE INVENTION

1. Field of the Invention

The present invention relates to a paste-type electrode for an alkali secondary cell, more specifically to that having a improved three-dimensional substrate.

2. Description of the Related Art

There are several types of electrode used in an alkali secondary cell such as a sinter type, paste type, and pocket type. Of all the types, the paste type electrode is most widely used, because the amount of the active material occupying the electrode can be increased, the electric capacity density can be enhanced, and the production cost can be reduced.

The paste type nickel electrode can be prepared, for example, by the following manner. Nickel hydroxide powder, an appropriate binder, and water are mixed to make paste. The paste is applied on a two-dimensional substrate such as expanded metal, porous metal, or nickel net to fill the empty spaces of the substrate. After, the substrate filled the paste is dried and pressed.

However, the paste-type nickel electrode manufactured as above entails a problem arising from the constitution of the electrode. In the electrode of this type, the distance between the particles of nickel used as the activation substance and the metal matrix constituting the two-dimensional electrode serving as a collector, is tens of times longer than that of the conventional sinter-type nickel electrode. Consequently, the paste-type electrode exhibits a conductivity poorer than that of the conventional electrode, creating the problem of a low utilization of the nickel hydroxide, as compared to that of the conventional sinter-type nickel electrode. The difference between these types of electrodes in utilization is prominent especially in the case of a large current discharge.

In consideration of the above-described problem, Published Unexamined Japanese Patent Application (PUJPA) No. 50-32450 discloses a method for manufacturing a felt-like metal porous member made of hollow metal fibers comprising steps of coating the surface of organic fibers with alkali-proof metal, and baking the organic fiber. This metal porous member is used as a three-dimensional substrate. In a three-dimensional substrate including the above-described felt-like metal porous member, the distribution of the hollow metal fibers can be made uniform, thereby reducing the irregularity of the electrode characteristics. Furthermore, the three-dimensional substrate is excellent in mechanical characteristics such as tensile strength, elongation percentage, etc., and these characteristics are important to roll the electrode stably.

However, when a paste-type electrode containing the felt-like metal porous member and having one polarity is rolled in a spiral manner along with another electrode having the other polarity and a separator interposed between the electrodes to assemble an alkali secondary cell, both electrodes are likely to touch with each other, thereby short-circuiting within the cell. More specifically, since the felt-type metal porous member is made of slender hollow metal fibers, each junction where metal fibers intersect with each other is small. Consequently, while rolling the paste-type electrode made of the felt-like metal porous member in a spiral manner as mentioned above, some of the hollow metal fibers of the porous member are broken off and cut from their junctions, and the ends of broken metal fibers are held pointed outward. As a result, the pointed ends of those broken fibers pierce the separator and are brought into contact with the other electrode having the opposite polarity, thereby short-circuiting within the cell.

Further, since the hollow metal fibers of the porous member are likely to be cut from junctions while rolling the paste-type electrode, transmission of electrons through the fibers is degraded, thereby lowering the porous member's collecting performance. Thus, the utilization of the activation substance is lowered.

In the meantime, U.S. Pat. No. 4,251,603 discloses a technique in which foaming resin is plated with metal and baked, and that in which foaming metal having a lattice diameter of the surface portion larger than that of the inner portion is used as a three-dimensional substrate.

SUMMARY OF THE INVENTION

It is an object of the present invention to provide a paste-type electrode for an alkali secondary cell which can prevent short-circuiting while the electrodes having the opposite polarity with a separator interposed therebetween are rolled altogether.

It is another object of the present invention to provide a paste-type electrode for an alkali secondary cell having an improved utilization.

According to the first aspect of the invention, there is provided a paste-type electrode for an alkali secondary cell comprising: a three-dimensional substrate including a felt-like metal porous member in which a plurality of hollow metal fibers are arranged three-dimensionally, diameters of those of said metal fibers arranged near the surface portion of said porous member being greater than those arranged in the inner portion, an average diameter of those of said metal fibers near the surface portion being in a range of 20 to 150 $\mu$m and an average diameter of those of said metal fibers in the inner portion being in a range of 10 to 100 $\mu$m; and paste containing an activation substance filled in said three-dimensional substrate.

According to the second aspect of the invention, there is provided a paste-type electrode for an alkali secondary cell comprising: a three-dimensional substrate; and paste filled into said three-dimensional substrate and containing an activation substance and at least one type of conductive material selected from the group consisting of metal cobalt and a cobalt compound, said activation substance comprising nickel hydroxide which occurs a dehydration reaction at a temperature of 270° C. or lower.

According to the third aspect of the invention, there is provided a paste-type electrode for an alkali secondary cell comprising: a three-dimensional substrate; and paste filled into said three-dimensional substrate and containing an activation substance and at least one type of conductive material selected from the group consisting of metal cobalt and a cobalt compound, said activation substance comprising nickel hydroxide which has the half value width of the peak of (101) plane in X-ray diffraction, (2$\theta$) being 0.8° or higher.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a partially explained perspective view of a nickel-cadmium secondary cell in which a paste-type electrode according to the invention is built in;

FIG. 4 is a characteristic diagram showing results of thermogravimetric analysis of nickel hydroxide employed in Example 6;

FIG. 5 is a characteristic diagram showing the relation between the charge and discharge cycle and the utilization of the positive electrode of the nickel-cadmium secondary cell employed in Example 6;

DETAILED DESCRIPTION OF THE PREFERRED EMBODIMENTS

Figure 1:
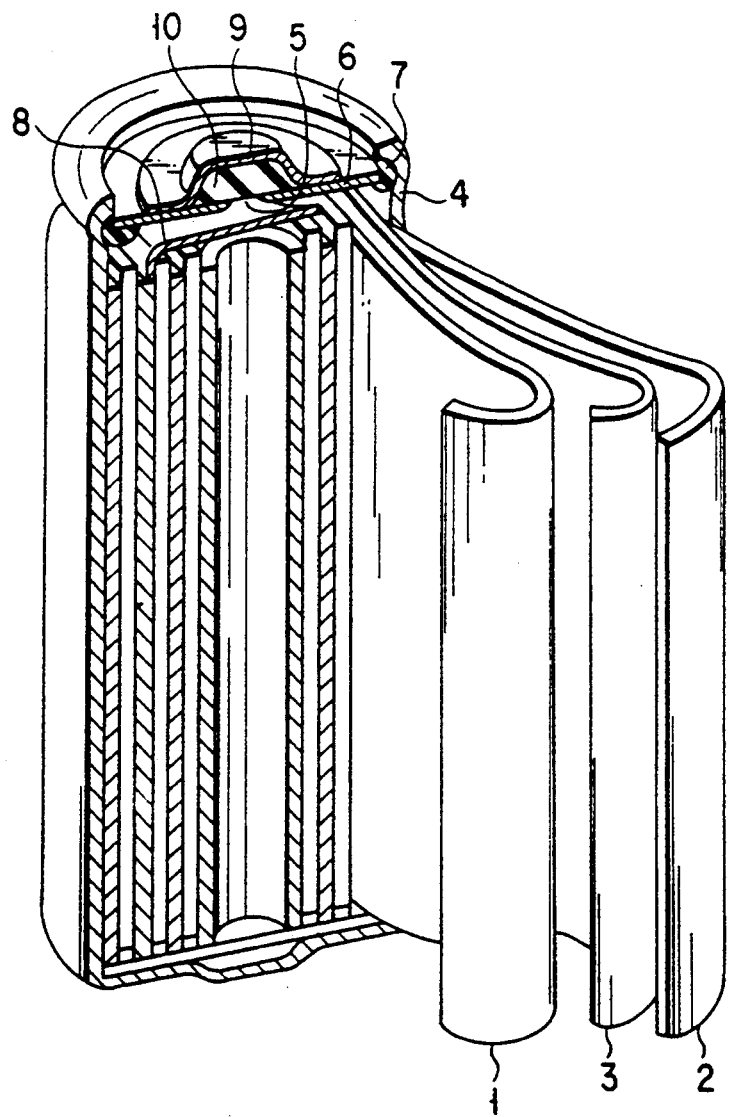

A secondary cell in which a paste-type electrode (e.g., paste-type nickel positive electrode) according to the invention is assembled will be described with reference to FIG. 1.

A paste-type nickel positive electrode 1 is rolled together with, for example, a cadmium negative electrode 2 while providing a separator 3 therebetween, and they are housed in a bottomed cylinder-like container 4, which also contains an alkali electrolyte. The separator 3 is made of synthetic resin non-woven material. A circular lid 6 having a hole 5 at its center portion is provided for the opening portion of the container 4. A ring-like insulation gasket 7 is interposed between the circumference of the lid 6 and the inner surface of the opening portion of the container 4 so as to fix the lid 6 to the container 4, and the container 4 is thus sealed by caulking the opening portion such as to reduce the diameter thereof. A positive electrode lead 8 has one end connected to the positive electrode 1, and the other end connected to the lower surface of the lid 6. A hat-shaped positive electrode terminal 9 is mounted on the lid 6 such as to cover the hole 5. A rubber-made safety valve 10 is set in a space defined by the lid 6 and the positive electrode terminal 9 such as to plug the hole 5.

The paste-type positive electrode has a structure including a three-dimensional substrate having a felt-like metal porous member in which a plurality of hollow metal fibers are three-dimensionally arranged, diameters of those of the metal fibers arranged near the surface portion of the porous member being greater than those arranged in the inner portion, the average diameter of those of the metal fibers near the surface portion being in a range of 20 to 150 $\mu$m and the average diameter of those of the metal fibers in the inner portion being in a range of 10 to 100 $\mu$m, and paste containing an activation substance filled in the three-dimensional substrate.

The hollow metal fibers constituting the felt-like metal porous member may be made of a single metal such as nickel, cobalt, or silver, or a material having a laminated structure in which two or more different types of metals are coaxially arranged. Regarding the hollow metal fiber having a laminated structure, it is preferable that a metal located in the inner side has a conductivity higher than that of a metal arranged in the outer side. Examples of the metal located in the inner side are noble metals such as Ag, Au, Pt, Pd, etc.

Figure 2:
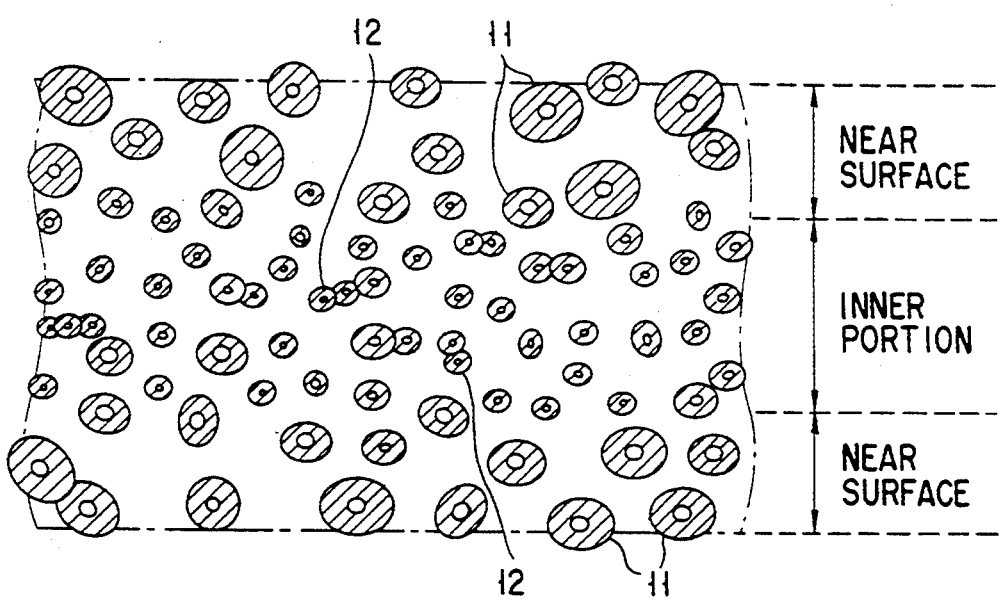
FIG. 2 is a cross section of a part of a three-dimensional substrate (felt-like metal porous member) employed in a paste-type electrode according to the invention.

The felt-like metal porous member should have a constitution in which the diameters of those hollow metal fibers 11 located near the surface portion of the member are larger than the diameters of those fibers 12 located in the inner portion thereof as shown in FIG. 2. More specifically, the diameters of the hollow metal fibers 11 are preferably 1.5 times or more as large as the diameters of the fibers 12, more preferably 2 times or larger. The reason for setting the diameters of the fibers 11 are preferably 1.5 times or more as large as those of the fibers 12 is as follows:

If the diameters of the metal fibers 11 is less than 1.5 times as those of the metal fibers 12, it will be difficult to make large-sized unbreakable junctions near the surface portion. Since the fibers 11 and the junctions thereof serves also to cover the ends of broken fibers 12, which may result in rolling of the electrodes, the diameters of the fibers 11 should be made as large as described above. Otherwise, short-circuiting caused by pointing up of the ends of the broken fibers 12 occurs.

In the meantime, the reason for setting the average diameter of those hollow metal fibers 11 located near surface portion of the felt-like metal porous member in the above-mentioned range is as follows:

If the average diameter of the metal fibers 11 is less than 20 $\mu$m, the size of each junction where the metal fibers 11 intersect with each other is so small that the mechanical strength of the metal porous member is degraded. Also, if the average diameter exceeds 150 $\mu$m, the amount of paste filled is decreased, and the collecting performance is decreased, accordingly.

The reason for setting the average diameter of those hollow metal fibers 12 located in the inner portion thereof in the above-mentioned range is as follows:

If the average diameter of the metal fibers 12 is less than 10 μm, the mechanical strength of the electrode is decreased. Also, if the average diameter exceeds 100 μm, the amount of paste filled is decreased, and the collecting performance is decreased, accordingly.

A texture size of the felt-like metal porous member is preferably 300 to 800 g/m² for the following reason. If the texture size is less than 300 g/m², the mechanical strength of the porous member will be degraded, making it difficult to use the metal porous member by itself whereas, if the texture size exceeds 800 g/m², the amount of paste filled will be also decreased, resulting in a low collecting performance.

Preparation of the felt-like material porous member will now be described.

A metal layer is formed on the surface of each single fiber made of organic non-woven fabric, and the organic non-woven fabric is heat-decomposed. Further, the resultant is sintered in a reducing atmosphere, completing a metal porous member made of many hollow metal fibers.

Examples of organic non-woven fabric are those prepared by forming synthetic fabric such as polyethylene, polypropylene, polyester, polyamide, etc. or carbon fabric into a non-woven state by use of suitable binder. Some of the methods of manufacturing the organic non-woven fabric are: (1) the dry non-woven fabric manufacturing method in which fibers having a length ranged in 2 to 10 cm are opened by a spinning guard, or fibers are integrated at random by an air flow; (2) the damp non-woven fabric manufacturing method in which fibers having a length of 1 cm or less are dispersed in water, and then are caught by a net; and (3) the spun bonded fabric manufacturing method in which molten resin is spun, and formed fibers are sprayed directly on a supporter at random. The organic non-woven fabric prepared by these methods includes a parallel web type in which fibers are arranged in parallel, and a cross web type in which fibers arranged to cross with each other.

Formation of the metal layer can be carried out, for example, in the following manner. First, a conductive material such as carbon, conductive resin, metal powder, or a compound of two or more of these is impregnated into or applied on the organic non-woven fabric to make it conductive, or the organic non-woven fabric is subjected to an electroless plating treatment to make the fabric conductive. Then, the organic non-woven fabric is subjected to electrolytic plating to form a metal layer thereon. In the case, the electrolytic plating treatment is carried out at a large current density without stirring the electrolyte, therefore, metal precipitates more near the surface portion of the organic non-woven fabric than in the inner portion. After this electrolytic plating treatment, the organic fabric is removed by heat decomposition, and the resultant is sintered in a reducing atmosphere so as to make the diameter of those hollow metal fibers located near the surface portion larger than those of metal fibers located in the inner portion.

The structure of the three-dimensional substrate allows to coat the surface of the felt-like metal porous member further with a net-like reinforcing layer made of hollow metal fibers.

The felt-like metal porous member coated with the net-like reinforcing layer can be prepared in the following manner. After integrating an organic non-woven fabric and net-like organic fabric with a binder, electroless plating is carried out on the integrated fabric to make it conductive, and then electrolytic plating is performed thereon. Then, the organic non-woven fabric and net-like organic fabric is removed by heat decomposition, and the resultant is sintered in a reducing atmosphere. Thus, a felt-like metal porous member coated with a net-like reinforcing layer is prepared.

Examples of net-like organic fabric are screen-like, expanded fabric made of natural, synthetic high polymer molecule, tulle, knitted fabric, non-woven fabric such as spun bonded elongated fabric, and nylon gauze.

The paste filled into the three-dimensional substrate has a composition including nickel hydroxide serving as an active substance, a conductive material, and a high molecular binder.

The conductive material contained in the paste may be, for example, metal cobalt, cobalt hydroxide, or cobalt monoxide. The amount ratio of the conductive material is preferably in the range of 5 to 10 parts by weight with respect to 100 parts by weight of nickel hydroxide.

The high molecular binder contained in the paste may be, for example, carboxymethylcellulose, polyacylate, or fluorine resin (e.g., polytetrafluoroethylene). The mixture ratio of the high molecular binder is preferably in the range of 1 to 5 parts by weight with respect to 100 parts by weight of nickel hydroxide.

The paste is filled into the three-dimensional substrate, and also allows to form a layer on the entire surface of the three-dimensional substrate. The thickness of the paste layer is preferably 10 to 100 μm for the following reason. If the thickness of the layer is less than 10 μm, it will be difficult to suppress pointing up of the broken slender metal fibers which are created while rolling the paste-type electrode including the felt-like metal porous member and another electrode having the opposite polarity with a separator interposed therebetween. On the other hand, if the thickness of the paste layer exceeds 100 μm, the distance between the three-dimensional substrate and the activation substance in the paste will be elongated, resulting in degradation of the collecting performance of the electrode.

It should be noted that as long as the paste layer covering the entire surface of the three-dimensional substrate contains nickel hydroxide as the main component, the paste does not necessarily have the same composition as that filled into the substrate.

The paste-type positive electrode can be prepared in the following manner. Nickel hydroxide and the conductive material are mixed with the high molecular binder in the presence of water to make paste, and the paste is filled into the three-dimensional substrate, and then, the substrate filled the paste is dried and pressed by rollers.

The paste-type electrode according to the present invention can be also used as a paste-type hydrogen absorbing alloy negative electrode in which paste containing hydrogen absorbing alloy is filled into a three-dimensional substrate.

Such paste containing the hydrogen absorbing alloy is made of, for example, hydrogen absorbing alloy powder, conductive material powder, and high molecular binder.

The type of hydrogen absorbing alloy is not strictly limited, and may be of any type as long as hydrogen generated electrochemically in an electrolyte can be absorbed, and the absorbed hydrogen can be easily released during discharge. Examples of the hydrogen absorbing alloy are: LaNi$_5$, MmNi$_5$, LmNi$_5$ (Mm; misch metal, Lm: lanthanum-enriched misch metal); multi-element alloys in which the Ni content of each of the mentioned alloys is partially substituted by element such as Al, Mn, Fe, Co, Ti, Cu, Zn, Zr, Cr, or B; TiNi-group alloys; and TiFe-group alloys.

Examples of the conductive material powder mixed into the paste are carbon black, and graphite powder. The mixture ratio of the conductive powder is preferably in the range of 0.5 to 2 parts by weight with respect to 100 parts by weight of hydrogen absorbing alloy.

Examples of the high molecular binder mixed in the paste are polyacrylate such as sodium polyacrylate or ammonium polyacrylate, carboxymethylcellulose, and fluoro-resin (e.g., polytetrafluoroethylene). The mixture ratio of polyacrylate, when it is used, is preferably in the range of 0.005 to 1 parts by weight with respect to 100 parts by weight of hydrogen absorbing alloy. In the case where carboxymethylcellulose is used, the mixture ratio thereof is preferably in the range of 0.01 to 1 part by weight with respect to 100 parts by weight of hydrogen absorbing alloy. In the case where fluoro-resin is used, the mixture ratio thereof is preferably in the range of 0.5 to 7 parts by weight with respect to 100 parts by weight of hydrogen absorbing alloy.

The paste-type hydrogen absorbing alloy negative electrode is prepare in the following manner. Hydrogen absorbing alloy powder, conductive material powder, and high molecular binder are kneaded in the presence of water into paste. The paste is filled into the three-dimensional substrate, and then the substrate filled the paste is dried and pressed by rollers.

Other than the paste-type nickel positive electrode, or the paste-type hydrogen absorbing alloy negative electrode, the paste-type electrode according to the invention permit to be also used as an electrode in which paste contains for example, cadmium, manganese dioxide, zinc, iron, lead, iron oxide, or catalyst, as an activation substance.

According to the invention, there is provided another type of paste-type electrode comprising: a three-dimensional substrate; and paste filled into said three-dimensional substrate and containing an activation substance and at least one type of conductive material selected from the group consisting of metal cobalt and a cobalt compound (for example, cobalt hydroxide, or cobalt monoxide), said activation substance comprising nickel hydroxide which occurs a dehydration reaction at a temperature of 270° C. or lower.

Examples of three-dimensional substrate are foaming metal and felt-like metal porous member as described above.

A type of nickel hydroxide which occurs a dehydration reaction at a temperature of 270° C. or lower is used as an activation substance for the paste for the following reason. Since other type of nickel hydroxide whose dehydration reaction temperature exceeds 270° C. has a less distorted crystal structure, the mobility of protons in the reaction taken place during a charging operation is low. Consequently, the paste-type electrode in which the type of nickel hydroxide whose dehydration reaction temperature exceeds 270° C. is used produces more γ-NiOOH, which is irreversibe, reducing the utilization of the activation substance.

It should be noted that it is preferable that the conductive material and the nickel hydroxide are non-eutectic with each other in the paste.

The mixture ratio of the conductive material with respect to the nickel hydroxide is preferably in the range of 5 to 10 wt %.

An eutectic substance made of nickel hydroxide and cadmium, or nickel hydroxide and zinc may be mixed into the paste. The mixture ratio of the eutectic substance is preferably in the range of 3 to 7 wt % against the nickel hydroxide.

Besides the nickel hydroxide and the conductive material, a high molecular binder such as carboxymethylcellulose, polyacrylate, or fluoro-resin (e.g., polytetrafluoroethylene) is blended into the paste. The blending ratio of the high molecular binder with respect to the nickel hydroxide is preferably in the range of 1 to 5 wt %.

The above-described paste-type electrode can be prepared in the following manner. The above-mentioned type of nickel hydroxide and the conductive material are mixed with the high molecular binder in the presence of water to make paste. The paste is filled into the three-dimensional substrate, and then, the substrate filled the paste is dried and pressed by rollers.

According to the invention, there is also provided another type of paste-type electrode comprising: a three-dimensional substrate; and paste filled into the three-dimensional substrate and containing an activation substance and a conductive material selected from the group consisting of metal cobalt and a cobalt compound (for example, cobalt hydroxide or cobalt monoxide), the activation substance comprising nickel hydroxide which has the half value width of the peak of (101) plane in X-ray diffraction (2θ) being 0.8° or higher.

Examples of the three-dimensional substrate are foaming metals, and the above-mentioned felt-like metal porous member.

A type of nickel hydroxide having a half value width of the peak of (101) plane in X-ray diffraction (2θ) of 0.8° or higher as an activation substance is used for the following reason. Since other type of nickel hydroxide whose half value width of the peak is less than 0.8° has a less distorted crystal structure, the mobility of protons in the reaction taken place during a charging operation is low. Consequently, the paste-type electrode in which the type of nickel hydroxide whose half value width of the peak of (101) plane in X-ray diffraction (2θ) is less than 0.8° is used produces more γ-NiOOH, which is irreversible, reducing the utilization of the activation substance.

The mixture ratio of the conductive material mixed the paste is the same as the case of the above-described paste-type electrode. The same eutectic substance and high molecular binder as those used in the paste-type electrode are blended into the paste.

The paste-type electrode according to the present invention exhibits a variety of good characteristics as set forth below.

(1) Since the felt-like metal porous member has diameters of hollow metal fibers arranged near the surface portion of the porous member being greater than those arranged in the inner portion, the average diameter of those metal fibers near the surface portion being in a range of 20 to 150 μm and the average diameter of those metal fibers in the inner portion being in a range of 10 to 100 μm, the area of each junction formed where metal fibers intersect with each other is larger near the surface portion than in the inner portion. Consequently, when a paste-type electrode including the felt-like metal porous member and having one polarity is rolled in a spiral manner along with another electrode having the other polarity and a separator interposed therebetween to assemble an alkali secondary cell, those junctions don't break, thereby, pointing up of the ends of the broken hollow metal fiber can be prevented. Thus, short-circuiting which occurs when the ends of broken fibers penetrate through the separator and are brought into contact with the other electrode, is reduced.

(2) Since the paste-type electrode has junctions which do not break when rolling the electrode, the collecting performance can be upgraded, therefore, improving the utilization of the activation substance.

(3) In the three-dimensional substrate, the surface of the felt-like metal porous member is coated with a net-like reinforcing layer made of hollow metal fibers. The reinforcing layer serves to the prevent pointing up of the ends of broken metal fibers from the porous member. Therefore, occurrence of short-circuiting can be further reduced.

(4) Another type of paste-type electrode according to the invention has a structure in which paste containing an activation substance is filled into the felt-like metal porous member, and the entire surface of the member is covered by a paste layer. This paste layer can prevent the pointing up of the ends of broken metal fibers from the porous member, thereby further decreasing occurrence of short-circuiting.

Further, another type of paste-type electrode according to the invention exhibits the following advantageous characteristics.

A type of nickel hydroxide which occurs a dehydration reaction at a temperature of 270° C. or less, or has a half value width of the peak of the (101) plane in the X-ray diffraction ($2\theta$) of 0.8° or more, has a distorted crystal structure. A paste-type electrode in which paste containing an appropriate type (so defined by the invention) of nickel hydroxide as an activation substance is filled into the three-dimensional substrate, has a high mobility of protons during the reaction taking place in a charging operation. Consequently, in the paste-type electrode, generation of irreversible $\gamma$-NiOOH which occurs during a charging operation can be suppressed. Thus, the utilization of the nickel hydroxide can be enhanced, and the degree of swelling of the nickel hydroxide can be reduced. An alkali secondary cell having such a paste-type electrode as its positive electrode has a remarkably prolonged cycle life.

Moreover, by blending a substance eutectic with the nickel hydroxide, cadmium, and zinc into the paste, it is possible to prevent the nickel hydroxide from unnecessarily distorting during a charge and discharge cycle. An alkali secondary cell employing such paste in the positive electrode has a further prolonged cycle life.

Examples of the present invention will now be described with reference to accompanying drawings.

EXAMPLE 1

A cross web in which fibers are arranged cross with each other was manufacturing from 2-denier polyethyleneterephthalate fabric by a dry method of opening fabric using of a spinning guard. The cross web was then dipped into an epoxy resin solution, and dried. The cross web was further heated to adhere the polyethyleneterephthalate fabric, and thus organic non-woven fabric having a texture size of 60 g/m$^2$ and a thickness of 2.5 mm was obtained.

The organic non-woven fabric was treated with a hydrochloric acid solution containing 10 g/l of tin chloride, and washed with water. The fabric was then soaked in a solution containing 0.35 g/l of paradium chloride for 3 minutes. After that, the fabric was sufficiently washed with water to activate the surface of the fibers thereof.

The fiber-activated non-woven fabric was soaked in a nickel chemical plating solution containing 30 g/l of nickel sulfate, 10 g/l of sodium citrate, 10 g/l of sodium hypophosphite, 10 g/l of sodium acetate, and 1 g/l of ammonium chloride at 70° C. for 10 minutes. The fabric was then washed with water and dried. The non-woven fabric was subjected to nickel electrolytic plating using a nickel metal plate as the opposite electrode, and a watt solution containing 240 g/l of nickel sulfate, 45 g/l of nickel chloride and 30 g/l of boric acid as the electrolyte under such conditions as a current density of 3 A/cm$^2$, and a welding time of 5 minutes. During the electrolytic plating, the electrolyte was not stirred. The nickel-plated non-woven fabric was washed with water, neutralized, again washed with water, and dried.

Nickel-plated organic non-woven fabric was baked at 500° C. for 30 minutes in the air to remove the fabric portion. Then, the resultant was sintered at 1050° C. for 30 minutes in a hydrogen gas atmosphere, and slowly cooled to prepare a felt-like metal porous member consisting of a number of hollow metal fibers. A texture size of the felt-like metal porous member thus prepared was 500 g/m$^2$. Further, in the porous member, the average diameter of those metal fibers located near the surface portion of the porous member was 80 $\mu$m, whereas that of those located in the inner portion of the member was 30 $\mu$m.

In the meantime, into a powder blend containing 90 parts by weight of nickel hydroxide and 10 parts by weight of cobalt monoxide, 0.5 wt % of carboxylmethylcellulose and 3.0 wt % of polytetrafluoroethylene, both with respect to the nickel hydroxide, were added. Further, 45 wt % of deionised water against the nickel hydroxide was added to the mixture, and kneaded into paste.

The paste was transferred into the tank of a device for filling paste into a three-dimensional substrate and having a rotation roll, and the felt-like metal porous member was passed through the paste, driven by the rotation roll. Thus, the cavities of the porous member was filled with paste by means of the flow pressure of the paste. After that, the paste-filled felt-like metal porous member was passed through a slit having knife edges at an interval of 1.4 mm at a speed of 500 mm/min. Then, the paste-filled felt-like metal porous member was dried by an infrared drying furnace, and pressed by rollers. Thus, a paste-type nickel positive electrode having a thickness of 0.55 mm was prepared.

EXAMPLE 2

Both of a parallel web in which fibers are arranged in parallel with each other and a cross web in which fibers are arranged diagonally cross with each other were fabricated from 2-denier polyethyleneterephthalate fabric by a dry method of opening fabric using of a spinning guard. The parallel and cross webs were then placed one on the other, and heated so that the polyethyleneterephthalate fibers can be adhered to each other. Thus, organic non-woven fabric having a texture size of 60 g/m² and a thickness of 2.5 mm was obtained.

The surfaces of the organic fibers of the non-woven fabric was activated in the same manner as in Example 1. The fabric was soaked in a solution prepared by mixing an alkali solution of sodium hydroxide containing 3.5 g/l of silver nitrate and a reducing solution containing 4 g/l of tartaric acid, 45 g/l of grape sugar and 100 ml of alcohol, for 5 minutes while stirring the mixture solution so as to apply a silver plate having a uniform thickness on the surface of each fiber. Then, the fabric was neutralized, washed with water, and dried to form a silver layer on the fabric.

Further, as in a manner similar to that of Example 1, the fabric was subjected to nickel electrolytic plating to form a metal layer on the fabric itself, and then the metal-plated fabric was baked so as to decompose and remove the fabric portion. After that, the resultant was sintered in a hydrogen gas atmosphere to prepare a felt-like metal porous member. The texture size of the felt-like metal porous member thus prepared was 500 g/m². Further, in the porous member, the average diameter of those metal fibers located near the surface portion was 80 μm, whereas that of those located in the inner portion was 30 μm. Further, the obtained metal porous member was subjected to chemical analysis, and it was found that the silver content of the member was 0.05 wt %.

Lastly, paste having the same composition as of Example 1 was filled into the obtained felt-like metal porous member, and which was pressurized, as in the same manner as Example 1, preparing a paste-type nickel positive electrode having a thickness of 0.55 mm.

Control 1

The same organic non-woven fabric as of Example 1 was subjected to surface activation of fibers in the same manner as Example 1, and then subjected to electroless plating as in Example 1.

After that, the fiber-surface-activated non-woven fabric was subjected to nickel electrolytic plating using a nickel metal plate as the opposite electrode, and a watt solution having the same composition as of Example 1 as the electrolyte under such conditions as a current density of 0.5 A/cm², and a welding time of 5 minutes. During the electrolytic plating, the electrolyte was sufficiently stirred. Nickel-plated non-woven fabric was washed with water, neutralized, again washed with water, and dried. The nickel-plated fabric was baked so as to decompose and remove the fabric portion. After that, the resultant was sintered in a hydrogen gas atmosphere to prepare a felt-like metal porous member. The texture size of the felt-like metal porous member thus prepared was 500 g/m². Further, in the porous member, the average diameter of those metal fibers located near the surface portion and that of those located in the inner portion were both 35 μm.

Lastly, paste having the same composition as of Example 1 was filled into the obtained felt-like metal porous member, and which was pressurized, as in the same manner as Example 1, preparing a paste-type nickel positive electrode having a thickness of 0.55 mm.

EXAMPLE 3

The same organic non-woven fabric as of Example 1, and tulle fabric, a type of net-like organic fabric were integrated with each other by an acrylic group-, or cellulose group-resin binder. Then, the integrated fabric was activated and further subjected to electroless plating and nickel electrolytic plating all in the same manner as Example 1.

Then, the integrated fabric was coated with a metal layer, and was subjected to heat decomposition to remove the fabric portion, as in the same manner as Example 1. Further, the resultant was sintered to prepare a felt-like metal porous member. The texture size of the felt-like metal porous member thus prepared was 500 g/m². Further, paste having the same composition as of Example 1 was filled into the obtained felt-like metal porous member, and which was pressurized, as in the same manner as Example 1, preparing a paste-type nickel positive electrode having a thickness of 0.55 mm.

EXAMPLE 4

Paste having the same composition as of Example 1 was filled into the obtained felt-like metal porous member as in Example 1, and which was pressurized to prepare a paste-type nickel positive electrode as in Example 1, except that the interval in the slit was expanded more than in the case of Example 1 to form a paste layer having a certain thickness on the surface of the metal porous member. The obtained paste-type nickel positive electrode has a 20 μm-thick paste layer on the surface of the porous member, and the thickness of the positive electrode itself was 0.55 mm.

The electrical resistance value of each of the felt-like metal porous members obtained in Examples 1 and 2, and Control 1 at a distance of 50 mm with respect to a test piece having a width of 20 mm, was measured by a four-electrode method, and the results were as shown in Table 1 below.

TABLE 1

|  | Electrical Resistance (mΩ) |
| --- | --- |
| Example 1 | 16 |
| Example 2 | 8 |
| Control 1 | 21 |

As is clear from Table 1, the felt-like metal porous member of Example 2 having a structure in which the inner circumferential side of those hollow metal fibers has a conductivity higher than that of the outer circumferential side thereof, exhibited an electrical resistance value as low as 8 mΩ, indicating its good conductivity.

In the meantime, 5 types of nickel-cadmium secondary cells were prepared using 5 types of paste-type nickel positive electrodes obtained in the above-described Examples 1 to 4 and Control 1. Each nickel positive electrode and a cadmium negative electrode were rolled in a spiral manner with a separator made of polypropylene non-woven fabric interposed therebetween, and the rolled materials are housed in a bottomed cylindrical container made of steel. Into each of the containers, an alkali electrolyte made of mixture of a 7N-KOH solution and 1N-LiOH solution was supplied to complete assembly of 5 types of nickel-cadmium secondary cells each having a theoretical capacity of 600 mAh and a structure shown in FIG. 1.

For the sake of insulation test, 10,000 cells were manufactured for each type of nickel-cadmium cell, and the number of cells having an internal short-circuiting problem was checked out of 10,000 for each. The results were as shown in Table 2.

TABLE 2

| | Number of No-Good Cells with Short-circuiting Problem |
| --- | --- |
| Example 1 | 35 |
| Example 2 | 29 |
| Example 3 | 7 |
| Example 4 | 0 |
| Control 1 | 381 |

As is clear from Table 2, regarding the secondary cells having the paste-type positive electrode made of a felt-like metal porous member according to the invention (Examples 1-4), the number of no-good cells with the short-circuiting problem, which can arise while rolling the electrode, was significantly smaller than that of the cell obtained in Control 1 in each case. Further, regarding the secondary cell having a paste-type positive electrode including a felt-like metal porous member coated with a net-like reinforcing layer (Example 3), and the cell having a positive electrode including a porous member in which a paste layer is formed on the entire surface thereof (Example 4), the number of cells with the problem of internal short-circuiting was further reduced.

The nickel-cadmium secondary cells prepared in Examples 1-4 and Control 1 were subjected to an examination for measuring the utilization of each paste-type nickel positive electrode. In the examination, each type of cell was subjected to 10 cycles of charging it to a 150% level at 0.2 CA and discharging to 1.0 V at 0.2 CA, and the utilization was obtained from the discharge capacity at the point when charged to a 150% level at 0.2 CA and discharged to 1.0 V at 1 CA with respect to the theoretical capacity. Further, the utilization under the same conditions as above was measured at different CAs, i.e. 2 CA, 3 CA, 4 CA, and 5 CA. The results were as shown in FIG. 3.

Figure 3:
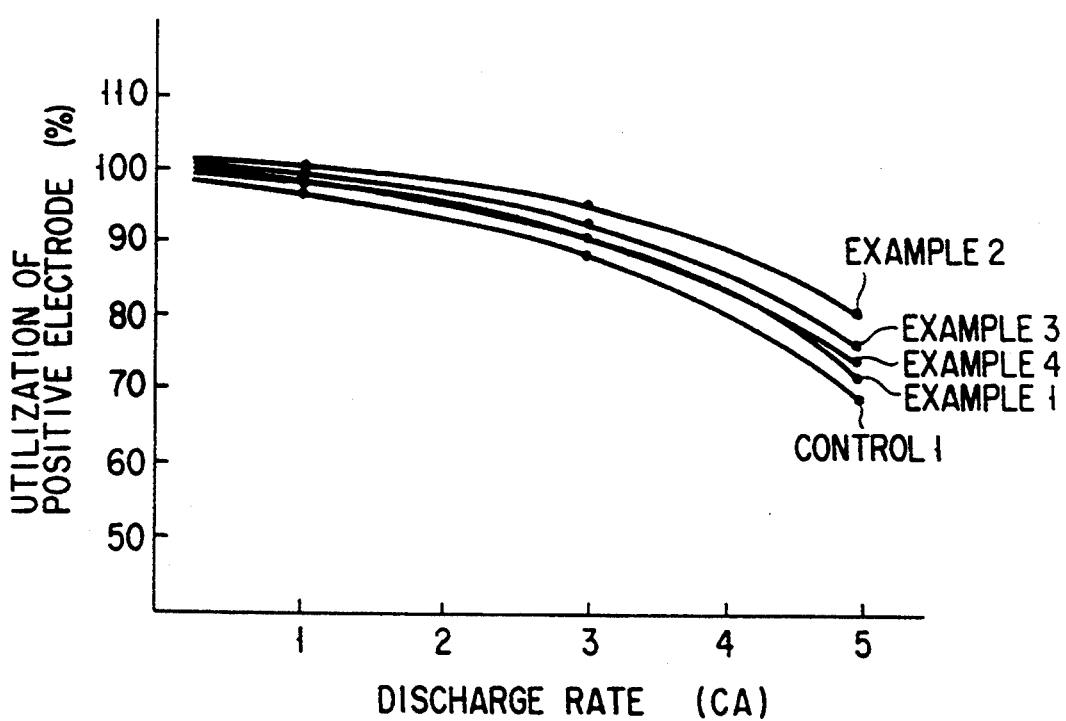
FIG. 3 is a characteristic diagram showing the utilization of a positive electrode of a nickel-cadmium secondary cell associated with Examples 1–4 and Control 1 during the cell is charged and discharged at higher current.

As is clear from FIG. 3, each of the paste-type positive electrode (Examples 1-4) of the secondary cells had a better conductivity than that of Control 1, and therefore the utilization of the activation substance in the case of discharge at higher current was upgraded as compared to that of Control 1 in each case. Further, regarding the secondary cell comprising a paste-type positive electrode including the felt-like metal porous member consisting of hollow metal fibers each of whose inner wall is coated with silver (Example 2) and the secondary cell comprising a paste-type positive electrode including a felt-like metal porous member coated with a net-like reinforcing layer (Example 3), the utilization in the case of a large current discharge was remarkably high as to these two examples.

EXAMPLE 5

Gaseous hydrogen was made absorbed into LmNi4.0Mn0.3Al0.3Co0.4, and released therefrom before use it, so as to granulate the material, thereby preparing hydrogen absorbing alloy powder having an average grain diameter of 35 μm. To 100 parts by weight of hydrogen absorbing alloy powder, 0.5 parts by weight of sodium polyacrylate, 0.1 parts by weight of carboxymethylcellulose, 1.5 parts by weight of the dispersion of polytetrafluoroethylene (specific gravity of 1.5, solid content of 60 wt %), 1.0 part by weight of carbon black, and 50 parts by weight of water were added, and the mixture was kneaded into paste.

Then, the paste was transferred into the tank of the same device as used in Example 1, and the felt-like metal porous member as of Example 1 was passed through the paste, driven by the rotation roll. Thus, the cavities of the porous member was filled with paste by means of the flow pressure of the paste. After that, the paste-filled felt-like metal porous member was passed through a slit having knife edges at an interval of 1.4 mm at a speed of 500 mm/min. Then, the paste-filled felt-like metal porous member was dried at 80° C., and pressed by rollers. Thus, a paste-type hydrogen absorbing alloy negative electrode was prepared.

After that, a nickel hydrogen secondary cell having a theoretical capacity of 600 mAh and a structure shown in FIG. 1 was assembled from the obtained hydrogen absorbing alloy negative electrode, a nickel positive electrode prepared in Example 4, a separator, a bottomed cylindrical container, and an alkali electrolyte.

10,000 of the above type of nickel hydrogen secondary cells were subjected to insulation test to count the number of no-good products with the problem of internal short-circuiting out of 10,000. The result indicated that the number of no-good products were as small as 2.

EXAMPLE 6

Using several types of nickel hydroxide, the temperature of the dehydration reaction from Ni(OH)$_2$ to NiO was measured for each one by a thermogravimetric analysis, and 4 types of nickel hydroxide, having reaction temperatures of 260° C., 270° C., 280° C., and 290° C., were selected out of them. An example of the result of the thermogravimetric analysis was shown in FIG. 4.

To 100 parts by weight of each type of nickel hydroxide having the above-mentioned temperature, 10 parts by weight of cobalt monoxide, 0.3 parts by weight of carboxymethylcellulose, and 30 parts by weight of water were added, and the mixture was kneaded to prepare 4 types of paste. Each type of paste was filled into the same felt-like metal porous member as of Example 1, and which was pressurized, as in the same manner as Example 1, preparing 4 types of paste-type nickel positive electrodes.

Then, 4 types of nickel-cadmium secondary cells each having a theoretical capacity of 600 mA, and a structure shown in FIG. 1 are assembled from each of the 4 types of positive electrode obtained in Example 6, and a cadmium negative electrode, a separator, a bottomed cylindrical container, and an alkali electrolyte, similar to those of Example 1.

The 4 types of nickel-cadmium secondary cells obtained were subjected to 500 cycles of a charge and discharge operation, i.e. 0.3 C charge and 1 C discharge, to measure the utilization with respect to the nickel positive electrode theoretical capacity in the case where the cycle number changes. The results were as shown FIG. 5.

As is clear from FIG. 5, each of the secondary cells comprising the paste-type positive electrode containing a type of nickel hydroxide having a dehydration reaction temperature of 270° C. or less as an activation substance exhibited an utilization as high as 95% at the initial stage, and the high utilization was maintained still after 500 cycles.

After completion of 500 cycles, the 4 types of the secondary cells, which can be differentiated from each other in dehydration reaction temperature of nickel hydroxide, in a charged state were disassembled, and each nickel positive electrode was removed and crushed. By use of an X-ray diffraction analysis device (tradename: XD-34 type X-ray diffraction analysis device of Shimazu Corporation) modified with Cu, and Ka vessels and graphite monochrometer, crushed pieces of each nickel positive electrode were subjected to analysis to measure the peak height (P−γ) of γ-NiOOH near 13°, and the peak height (P−β) of β-NiOOH near 19° at 2θ. The production ratio was obtained from these two values by formula (P−γ)/((P−γ)+(P−β)) for each type. Note that the production ratio is a ratio of γ-NiOOH with respect to NiOOH (α-NiOOH+β-NiOOH) which was producted at different dehydration reaction temperatures of nickel hydroxide during charge. The results were as shown in FIG. 6.

Figure 6:
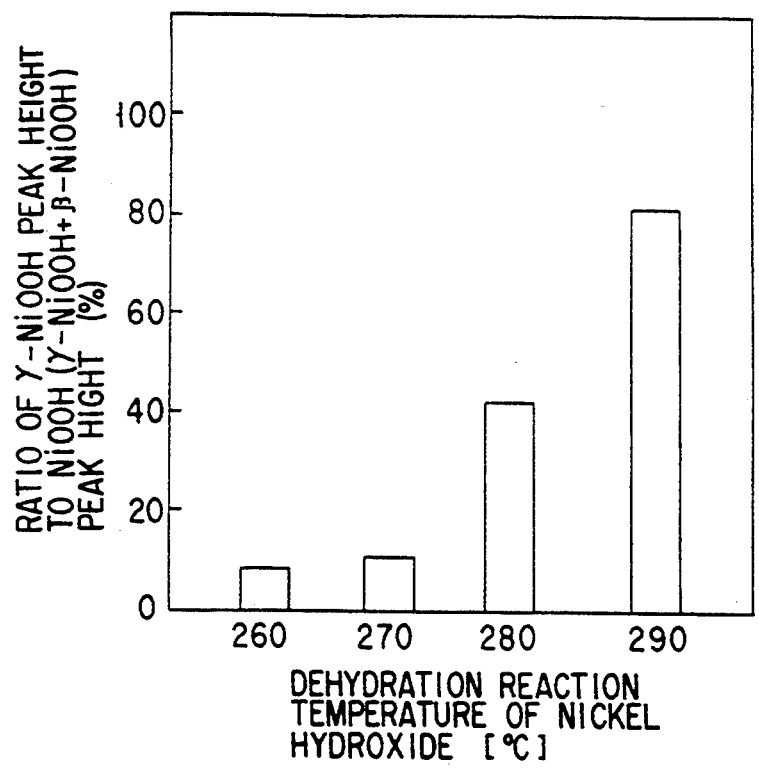
FIG. 6 is a characteristic diagram showing the relation between a dehydration reaction temperature of nickel hydroxide in the positive electrode and a generation rate of γ-NiOOH after completion of 500 cycles, in the nickel-cadmium secondary cell employed in Example 6.

As is clear from FIG. 6, each of the secondary cells comprising the paste-type positive electrode containing a type of nickel hydroxide having a dehydration reaction temperature of 270° C. or more as an activation substance exhibited a γ-NiOOH production ratio against NiOOH (α-NiOOH+β-NiOOH) which was produced during charge as high as 40–80%, indicating that distribution of the electrolyte is irregular due to swelling of the activation substance. Thus, it is necessary to use a type of nickel hydroxide having a dehydration reaction temperature of 270° C. or less in order to decrease of the production ratio of γ-NiOOH.

EXAMPLE 7

Figure 7:
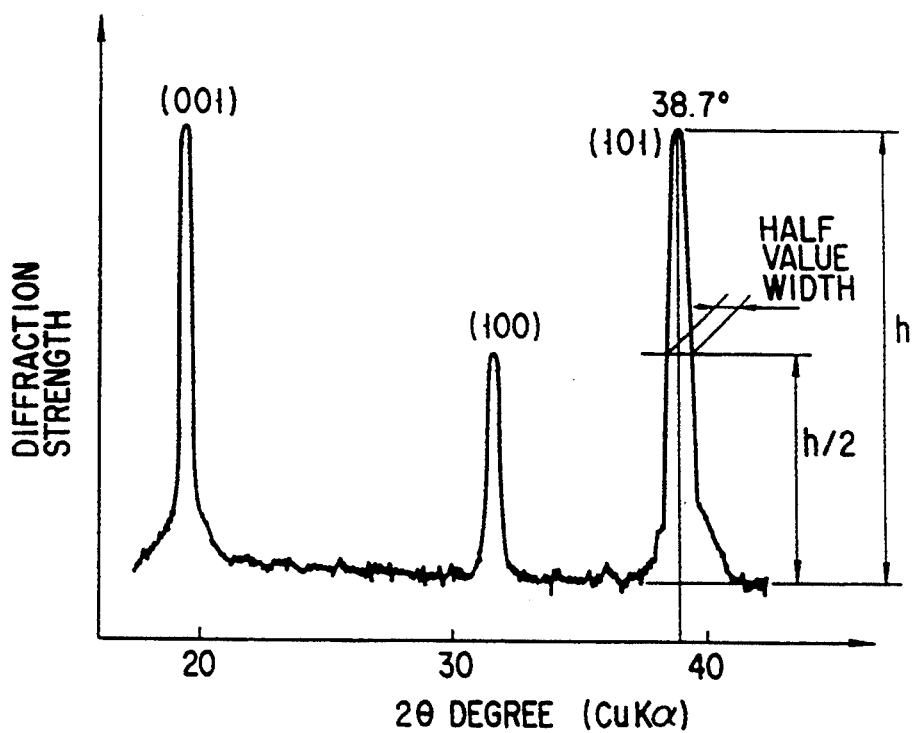
FIG. 7 is a characteristic diagram showing the result of X-ray diffraction of nickel hydroxide employed in Example 7.

Using several types of nickel hydroxide, the crystal structure was measured for each one by the same X-ray diffraction analysis device modified with Cu, and Ka vessels and graphite monochrometer, and 4 types of nickel hydroxide, having half value widths of the peaks near 38.7° indicating (101) plane, of 0.9°, 0.8°, 0.7°, and 0.6°, were selected out of them. An example of the result of the X-ray diffraction was shown in FIG. 7.

To 100 parts by weight of each type of nickel hydroxide having the above-mentioned half value width, 10 parts by weight of cobalt monoxide, 0.3 parts by weight of carboxymethylcellulose, and 30 parts by weight of water were added, and the mixture was kneaded to prepare 4 types of paste. Each type of paste was filled into the same felt-like metal porous member as of Example 1, and which was pressurized, as in the same manner as Example 1, preparing 4 types of paste-type nickel positive electrode.

Then, 4 types of nickel-cadmium secondary cells each having a theoretical capacity of 600 mA, and a structure shown in FIG. 1 are assembled from each of the 4 types of positive electrode obtained in Example 7, and a cadmium negative electrode, a separator, a bottomed cylindrical container, and an alkali electrolyte, similar to those of Example 1.

The 4 types of nickel-cadmium secondary cells obtained were subjected to 500 cycles of a charge and discharge operation, i.e. 0.3 C charge and 1 C discharge, to measure the utilization with respect to the nickel positive electrode theoretical capacity in the case where the cycle number changes. The results were as shown FIG. 8.

Figure 8:
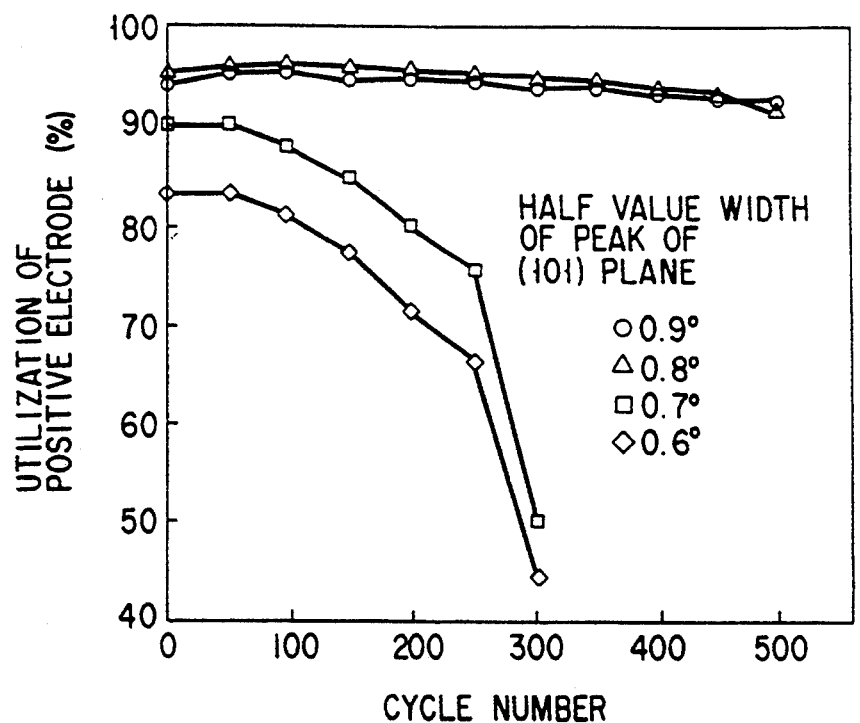
FIG. 8 is a characteristic diagram showing the relation between the charge and discharge cycle and the utilization of the positive electrode, in the nickel-cadmium secondary cell employed in Example 7.

As is clear from FIG. 8, each of the secondary cells comprising the paste-type positive electrode containing a type of nickel hydroxide having a half value width of the peak near 38.7° indicating the (101) plane of 0.8° or more exhibited an utilization as high as 95% at the initial stage, and the high utilization was maintained still after 500 cycles.

After completion of 500 cycles, the 4 types of the secondary cells, which can be differentiated from each other in half value width of nickel hydroxide, in a charged state were disassembled, and each nickel positive electrode was removed and crushed. By use of the X-ray diffraction analysis device modified with Cu, and Ka vessels and graphite monochrometer, crushed pieces of each nickel positive electrode were subjected to analysis to measure the peak height (P−γ) of γ-NiOOH near 13°, and the peak height (P−β) of β-NiOOH near 19° at 2θ. The production ratio was obtained from these two values by formula (P−γ)/((P−γ)+(P−β)) for each type. Note that the production ratio is a ratio of γ-NiOOH with respect to NiOOH (α-NiOOH+β-NiOOH) which was produced at different half value widths of the peaks of nickel hydroxide during charge. The results were as shown in FIG. 9.

Figure 9:
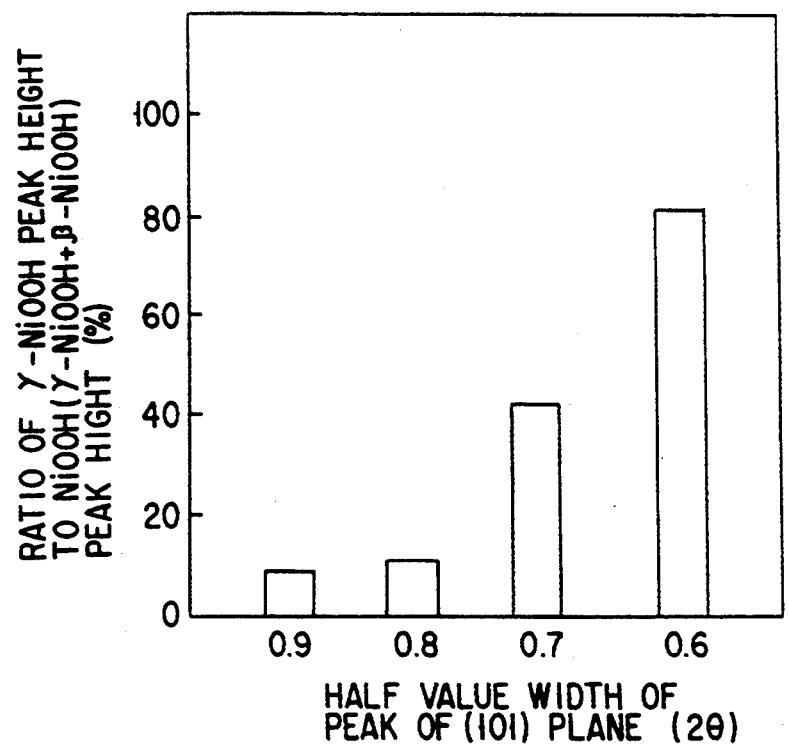
FIG. 9 is a characteristic diagram showing the relation between a half value width of X-ray diffraction of nickel hydroxide in the positive electrode and a generation rate of γ-NiOOH after completion of 500 cycles, in the nickel-cadmium secondary cell employed in Example 7.

As is clear from FIG. 9, each of the secondary cells comprising the paste-type positive electrode containing a type of nickel hydroxide having a half value width of the peak near 38.7° indicating the (101) plane of less than 0.8° exhibited a γ-NiOOH production ratio to NiOOH (α-NiOOH+β-NiOOH) which was produced during charge as high as 40–80%, indicating an irregular distribution of the electrolyte caused by swelling of the activation substance. Thus, it is necessary to use a type of nickel hydroxide having a half value width of 0.8° or more in order to decrease of the production ratio of γ-NiOOH.

In each of Examples 6 and 7, the secondary cell has a structure in which the paste-type nickel positive electrode 1 and the cadmium negative electrode 2 are rolled in a spiral manner with the separator 3 interposed therebetween, and the rolled electrodes are housed in the bottomed cylindrical container 4. However, the invention is not limited to this structure, and may have a structure in which a number of paste-type nickel positive electrodes and a number of cadmium negative electrodes are arranged alternately one on another with a separator interposed between each pair to form a multi-layered material, and the multi-layered material is housed in a bottomed prismatic container.

As described, with the paste-type electrode according to the present invention, occurrence of internal short-circuiting, which is likely to happen when an electrode is rolled along with another electrode having the opposite polarity and a separator interposed therebetween, can be reduced, and also the utilization can be enhanced. Further, an alkali secondary cell comprising another type of paste-type electrode according to the invention has a high initial utilization, and a remarkably prolonged cycle life.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A paste-type electrode for an alkali secondary cell consisting essentially of:

a three-dimensional substrate including a porous felt-metal member in which a plurality of hollow metal fibers are arranged three-dimensionally, diameters of those of said metal fibers arranged near the surface portion of said porous member being greater than those arranged in the inner portion, a diameter of those of said metal fibers near the surface portion being in a range of 20 to 150 μm, and a diameter of those of said metal fibers in the inner portion being in a range of 10 to 100 μm; and paste containing an activation substance filled in said three-dimensional substrate.

2. A paste-type electrode according to claim 1, wherein an average diameter of those of said metal fibers located near the surface portion of said felt-like metal porous member is 1.5 times or more as large as that of those of said metal fibers located in the inner portion of said porous member.

3. A paste-type electrode according to claim 1, wherein said porous felt-metal member has a texture size of 300 g/m$^2$ to 800 g/m$^2$.

4. A paste-type electrode according to claim 1, wherein said three-dimensional substrate has a structure in which the surface of said porous felt-metal member is further covered by a net reinforcing layer made of hollow metal fibers.

5. A paste-type electrode according to claim 1, wherein an inside of said three-dimensional substrate is filled with said paste, and an entire surface of said substrate is coated with a layer made of said paste.

6. A paste-type electrode according to claim 5, wherein said layer has a thickness of 10 to 100 μm.

7. A paste-type electrode according to claim 1, wherein said paste contains nickel hydroxide as an activation substance.

8. A paste-type electrode according to claim 1, wherein said paste contains hydrogen absorbing alloy.

9. A paste-type electrode according to claim 1, wherein said hollow metal fibers have a laminated structure in which two different types of metals are coaxially arranged.

10. A paste-type electrode according to claim 9, wherein an inner circumferential side of each of said hollow metal fibers is made of a noble metal selected from the group consisting of Ag, Au, Pt and Pd, and an outer circumferential side of each of said hollow fibers is made of Ni.

11. A paste-type electrode according to claim 1, wherein Said paste contains an activation substance and at least one type of conductive material selected from the group consisting of metal cobalt and a cobalt compound, said activation substance comprising nickel hydroxide which has a half value width of the peak of (101) plane in X-ray diffraction (2θ) being 0.8° or higher.

12. A paste-type electrode according to claim 11, wherein said conductive material and said nickel hydroxide are non-eutectic with each other in said paste.

13. A paste-type electrode according to claim 11, wherein said activation substance further contains an eutectic substance made of nickel hydroxide and cadmium.

14. A paste-type electrode according to claim 11, wherein said activation substance further contains an eutectic substance made of nickel hydroxide and zinc.

15. A paste-type electrode according to claim 1, wherein said paste contains an activation substance and at least one type of conductive material selected from the group consisting of metal cobalt and a cobalt compound, said activation substance comprising nickel hydroxide which has a dehydration reaction temperature of 270° C. or lower by thermogravimetric analysis.

16. A paste-type electrode according to claim 15, wherein said conductive material and said nickel hydroxide are non-eutectic with each other in said paste.

17. A paste-type electrode according to claim 15, wherein said activation substance further contains an eutectic substance made of nickel hydroxide and cadmium.

18. A paste-type electrode according to claim 15, wherein said activation substance further contains an eutectic substance made of nickel hydroxide and zinc.

* * * * *